(12) United States Patent
Stern et al.

(10) Patent No.: US 8,464,244 B2
(45) Date of Patent: Jun. 11, 2013

(54) IMPLEMENTATION TOOL COMBINING PRE-CONFIGURATION AND QUESTIONNAIRE

(75) Inventors: Daniel Scott Stern, Denver, CO (US); Manuel Albert Neyra, Highlands Ranch, CO (US); Yu-Feng Gu, Aurora, CO (US); Thomas R. Williams, Lone Tree, CO (US); Jason K. Reicheneker, Highlands Ranch, CO (US); Shawn A. Martine, Denver, CO (US); Timothy Threlkeld, Denver, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1316 days.

(21) Appl. No.: 11/970,833

(22) Filed: Jan. 8, 2008

(65) Prior Publication Data

US 2009/0178034 A1    Jul. 9, 2009

(51) Int. Cl.
*G06F 9/445* (2006.01)
(52) U.S. Cl.
USPC .......................................... 717/174; 717/172
(58) Field of Classification Search
USPC .................. 717/120–123, 172–173, 176–178
See application file for complete search history.

(56) References Cited

U.S. PATENT DOCUMENTS

| | | | |
|---|---|---|---|
| 6,256,773 B1 | 7/2001 | Bowman-Amuah | |
| 6,606,744 B1 * | 8/2003 | Mikurak | 717/174 |
| 6,741,997 B1 | 5/2004 | Liu et al. | |
| 6,836,657 B2 | 12/2004 | Ji et al. | |
| 7,191,435 B2 | 3/2007 | Lau et al. | |
| 7,206,828 B1 | 4/2007 | Bourke-Dunphy et al. | |
| 7,346,627 B2 | 3/2008 | Ramanathan et al. | |
| 7,836,458 B1 | 11/2010 | Gwozdz et al. | |
| 7,865,707 B2 | 1/2011 | Bittlingmayer et al. | |
| 7,873,684 B2 | 1/2011 | Souder et al. | |
| 2004/0128644 A1 | 7/2004 | Hurst et al. | |
| 2005/0010919 A1 | 1/2005 | Ramanathan et al. | |
| 2005/0038831 A1 | 2/2005 | Souder et al. | |
| 2005/0055351 A1 | 3/2005 | Barton et al. | |
| 2005/0068558 A1 | 3/2005 | Wang et al. | |
| 2005/0138558 A1 | 6/2005 | Duevel et al. | |
| 2005/0188367 A1 | 8/2005 | Oberholtzer | |
| 2006/0015839 A1 | 1/2006 | Owens et al. | |
| 2007/0061803 A1 | 3/2007 | Barrett | |

(Continued)

OTHER PUBLICATIONS

Serbedzija et al., "E-Quest: A Simple Solution for E-Questionnaires", 2004, IADIS International Conference e-Society, pp. 425-432.*

(Continued)

*Primary Examiner* — Ted T Vo
(74) *Attorney, Agent, or Firm* — Kilpatrick Townsend & Stockton LLP

(57) ABSTRACT

Systems, methods, and machine-readable media are disclosed for configuration of an application program using a set of pre-configuration data and a questionnaire. In one embodiment, a method for delivering configuration information for an application, can comprise saving a set of configuration information related to the application. A set of one or more questions related to configuration of the application can be defined and saved. In some cases, at least one of the set of one or more questions related to configuration of the application can relate to at least a subset of the set of configuration information. The set of configuration information and the set of one or more questions can be delivered for use in configuring an installation of the application.

25 Claims, 7 Drawing Sheets

U.S. PATENT DOCUMENTS

| | | |
|---|---|---|
| 2007/0157170 A1 | 7/2007 | Reiss et al. |
| 2007/0220248 A1 | 9/2007 | Bittlingmayer et al. |
| 2007/0240152 A1 | 10/2007 | Li et al. |
| 2007/0256056 A1 | 11/2007 | Stern et al. |
| 2008/0209413 A1 | 8/2008 | Kakumani et al. |
| 2008/0243589 A1* | 10/2008 | Lim et al. .................. 705/10 |
| 2008/0271008 A1 | 10/2008 | Dettori et al. |
| 2009/0083728 A1 | 3/2009 | Dennis et al. |
| 2010/0180270 A1 | 7/2010 | Williams et al. |

OTHER PUBLICATIONS

Gupta Manoj, "Oracle iSetup User Guide", Release 11i.9, Part No. B10695-01, Jun. 2003, Oracle Corporation, 156 pages.*

About Oracle iSetup Mini-Pack 11i.AZ.F, Jul. 20, 2006, ile://C:\Documents and Settings\sbm\Local Settings\Temp\About Oracle iSetup Mini-pac . . . , 8 pages.

Gupta, Manoj, "Oracle iSetup User Guide," Release 11i, part No. B10695-02, Sep. 2004, Oracle Corporation, 500 Oracle Parkway, Redwood Shores, CA, 137 pages.

Oracle iSetup 11i Data Sheet, iSetup Migrator Key Features and iSetup Reporter Key Features, Sep. 2004, Oracle Corporation, 500 Oracle Parkway, Redwood Shores, CA, 3 pages.

U.S. Appl. No. 11/380,254, filed Apr. 26, 2006.

What is Oracle iSetup?, Key Product Benefits, Jul. 20, 2006, file://C:\Documents and Settings\sbm\Local Settings\Temp\Apps Migrator.htm, 2 pages.

U.S. Appl. No. 11/380,254, filed Apr. 26, 2006, Office Action dated Oct. 12, 2011, 24 pages.

Author Unknown, "Exporting and importing Content," Oracle Corporation, 2004, 52 pages.

Lubbers, P., "Oracle9/AS Portal Configuration Guide, Release 2 (9.0.2)," Oracle Corporation, 2002, 188 pages.

U.S. Appl. No. 11/380,254, filed Apr. 26, 2006 by Daniel Scott Stern et al., Final Office Action dated Apr. 11, 2012, 29 pages.

U.S. Appl. No. 11/380,254, filed Apr. 26, 2006 by Daniel Scott Stern et al., Advisory Action dated Sep. 13, 2010, 3 pages.

U.S. Appl. No. 12/354,057, filed Jan. 8, 2008 by Thomas R. Williams et al., Office Action dated Apr. 4, 2012, 27 pages.

* cited by examiner

IMPLEMENTATION TOOL COMBINING PRE-CONFIGURATION AND QUESTIONNAIRE

BACKGROUND OF THE INVENTION

Embodiments of the present invention relate generally to configuring application programs and more particularly to setup and configuration of an application program using a set of pre-configuration data and a questionnaire.

When installing an application, any number of different settings can be configured for a variety of different aspects of the application. For example, most users of different types of applications are familiar with user preference type settings for controlling the look and feel of an application as well as other aspects of how the application behaves. Of course, any number of other types of settings are configurable as known in the art. As the size of the application grows, the number of configurable features or aspects of the application can grow as well. Thus, for a large application, application suite, or enterprise solution, the number of settings that may be configured or set at installation time can be overwhelming or, at the least, difficult and time consuming to deal with.

In some cases, such applications may be pre-configured by the software vendor or other party providing the software or services related thereto. For example, an application suite may be provided to a user with some or all of the possible configurations pre-set. In some cases, the application may be pre-configured for a particular market, use or application, region, etc. After installation, the user can adjust or modify these configurations. In other cases, large applications can be configured via an interactive process such as a wizard or other set-up routine. These routines, run at installation or upon request, present an interactive dialog to query the user as to the configuration desired which is then set via the routine. Again, the user can adjust or modify these configurations, perhaps by re-executing the set-up routine or by manually changing configuration settings.

However, both of these approaches have drawbacks. For example, using a pre-configured application can create the impression that the vendor is forcing users into a "one size fits all" solution. Such an impression is unappealing to consumers and can create barriers to sales. A pre-configuration application can also hide or obscure valuable flexibility or functionality of value to the customer. Using an interactive set-up routine such as a wizard gives the impression that the application is more truly customized to the user. However, for large applications, application suites, enterprise solutions, etc., with very large numbers of configurable aspects, a comprehensive or complete set-up routine would be time consuming and burdensome. Hence, there is a need in the art for improved methods and systems for setup and configuration of an application.

BRIEF SUMMARY OF THE INVENTION

Systems, methods, and machine-readable media are disclosed for configuration of an application program using a set of pre-configuration data and a questionnaire. In one embodiment, a method for delivering configuration information for an application, can comprise saving a set of configuration information related to the application. In some cases, prior to saving the set of configuration information related to the application, a base version of the application can be configured and the set of configuration information can be extracted from the base version of the application. A set of one or more questions related to configuration of the application can be defined and saved. In some cases, at least one of the set of one or more questions related to configuration of the application can relate to at least a subset of the set of configuration information. The set of configuration information and the set of one or more questions can be delivered for use in configuring an installation of the application.

Defining the set of one or more questions can comprise identifying the one or more questions. The one or more questions can then be implemented. Implementing the one or more questions can comprise defining a load action associated with an answer to each question, the load action defining one or more configuration settings of the application to set based on the answer to each question. For example, the load action can comprise an Application Program Interface (API) call to the application program for setting the one or more configuration settings. A set of data defining suggested answers to the one or more questions can be seeded. In such a case, saving the set of one or more questions comprises saving the seeded set of data.

The set of configuration information can comprise configuration information for a plurality of different configurations of the application. In such a case, the set of questions can comprise at least one question directed to selecting one of the plurality of different configurations of the application. The set of questions can also comprise at least one subset of questions related to the selected configuration.

An executable version of the application can be configured based on the set of configuration information and answers to the set of one or more questions. Configuring the executable version of the application based on the set of configuration information and answers to the set of one or more questions can comprise loading the configuration information as configuration settings for the executable version of the application, presenting the set of one or more questions, receiving the answers to the one or more questions, and updating the configuration settings for the executable version of the application based on the answers to the set of one or more questions.

According to another embodiment, a method for configuring an application can comprise loading a set of pre-configuration information as configuration settings for an executable version of the application. A set of one or more questions related to configuration of the application can be presented and answers to the one or more questions can be received. For example, at least one of the set of one or more questions related to the configuration of the application can relate to at least a subset of the pre-configuration information. The configuration settings for the executable version of the application can be updated based on the answers to the set of one or more questions.

In some cases, the set of configuration information can comprise configuration information for a plurality of different configurations of the application. In such cases, the set of questions can comprise at least one question directed to selecting one of the plurality of different configurations of the application. One set of different configurations of the application can be selected based on an answer to the at least one question directed to selecting one of the plurality of different configurations. Furthermore, in such cases, the set of questions can comprise at least one subset of questions related to the selected configuration. Presenting the set of one or more questions related to configuration of the application can then comprise presenting the subset of questions related to the selected configuration.

According to yet another embodiment, a system can comprise a processor and a memory communicatively coupled with and readable by the processor. The memory can have stored therein a set of instructions which, when executed by the processor, cause the processor to save a set of configuration information related to an application. In some cases, prior to saving the set of configuration information related to the application, a base version of the application can be configured and the set of configuration information can be extracted from the base version of the application. A set of one or more questions related to configuration of the application can be defined and saved. In some cases, at least one of the set of one or more questions related to configuration of the application can relate to at least a subset of the set of configuration information. The set of configuration information and the set of one or more questions can be delivered for use in configuring an installation of the application.

Defining the set of one or more questions can comprise identifying the one or more questions. The one or more questions can then be implemented. Implementing the one or more questions can comprise defining a load action associated with an answer to each question, the load action defining one or more configuration settings of the application to set based on the answer to each question. For example, the load action can comprise an Application Program Interface (API) call to the application program for setting the one or more configuration settings. A set of data defining suggested answers to the one or more questions can be seeded. In such a case, saving the set of one or more questions comprises saving the seeded set of data.

The set of configuration information can comprise configuration information for a plurality of different configurations of the application. In such a case, the set of questions can comprise at least one question directed to selecting one of the plurality of different configurations of the application. The set of questions can also comprise at least one subset of questions related to the selected configuration.

An executable version of the application can be configured based on the set of configuration information and answers to the set of one or more questions. Configuring the executable version of the application based on the set of configuration information and answers to the set of one or more questions can comprise loading the configuration information as configuration settings for the executable version of the application, presenting the set of one or more questions, receiving the answers to the one or more questions, and updating the configuration settings for the executable version of the application based on the answers to the set of one or more questions.

According to still another embodiment, a machine-readable medium can have stored thereon a series of instructions which, when executed by a processor, cause the processor to configure an application by loading a set of pre-configuration information as configuration settings for an executable version of the application. A set of one or more questions related to configuration of the application can be presented and answers to the one or more questions can be received. For example, at least one of the set of one or more questions related to the configuration of the application can relate to at least a subset of the pre-configuration information. The configuration settings for the executable version of the application can be updated based on the answers to the set of one or more questions.

In some cases, the set of configuration information can comprise configuration information for a plurality of different configurations of the application. In such cases, the set of questions can comprise at least one question directed to selecting one of the plurality of different configurations of the application. One set of different configurations of the application can be selected based on an answer to the at least one question directed to selecting one of the plurality of different configurations. Furthermore, in such cases, the set of questions can comprise at least one subset of questions related to the selected configuration. Presenting the set of one or more questions related to configuration of the application can then comprise presenting the subset of questions related to the selected configuration.

DETAILED DESCRIPTION OF THE INVENTION

Figure 1:
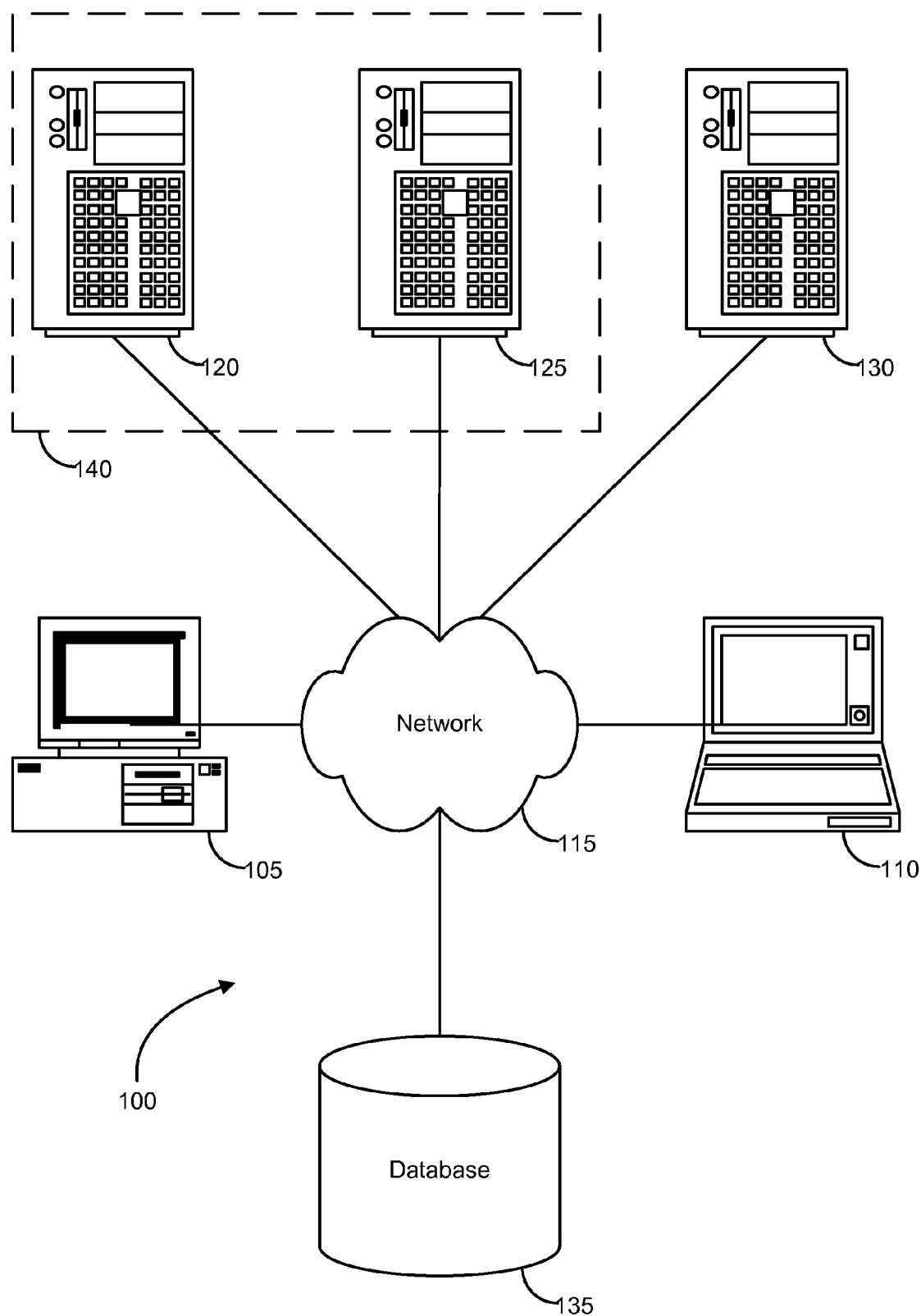
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Importantly, it should be noted that embodiments of the present invention may be implemented in a wide variety of environments and on a wide variety of devices and/or systems. Therefore, the following exemplary environments and systems are offered for illustrative purposes only and should not be considered limiting on the wide variety of possible implementation of the various embodiments of the present invention.

Generally speaking, embodiments of the present invention provide methods and systems for setup and/or configuration of an application program using a set of pre-set configuration data and a questionnaire. That is, an application suite, enterprise solution or other application can be configured with a predetermined set of configuration information that provides a base configuration for an executable version of the application. This base configuration may be tailored to a particular market, industry, region, group of users, etc. A set of questions can then be presented to a user or other party performing configuration of the system. The questions can be directed to configuration of aspects of the application including those aspects affected by the pre-set configuration data. Additionally or alternatively, the questions can be directed to configuration of different aspects of the application not affected by the pre-set configuration data. That is, the pre-set configuration data and the questions presented may or may not overlap in scope. Regardless of the exact scope of the questions, the configuration of the executable version of the application can be set or updated based on the answers to the questions.

Stated another way, delivering configuration information for an application can comprise saving a set of configuration information related to the application. A set of one or more questions related to configuration of the application can be defined and saved. The set of configuration information and the set of one or more questions can be delivered for use in configuring an installation of the application. An executable version of the application can be configured based on the set of configuration information and answers to the set of one or more questions. Configuring the executable version of the application based on the set of configuration information and answers to the set of one or more questions can comprise loading the configuration information as configuration settings for the executable version of the application, presenting the set of one or more questions, receiving the answers to the one or more questions, and updating the configuration settings for the executable version of the application based on the answers to the set of one or more questions.

As will be described in detail below, defining the set of one or more questions can comprise identifying the one or more questions and implementing the one or more questions according to a predetermined data model. That is, there can be a data model associated with the questions that allows the suggested 'answers' to be pre-seeded and saved when they are manipulated by the user. Implementing the one or more questions can comprise defining a load action associated with an answer to each question, the load action defining one or more configuration settings of the application to set based on the answer to each question. For example, the load action can comprise an Application Program Interface (API) call to the application program for setting the one or more configuration settings. That is, questions provided for configuring the application can be provided in a form that includes, for example, the question to be asked, an indication of one or more configuration settings to which that question relates, and an appropriate API call for updating or saving the settings to which the question relates once the answer to the question is received from the user. Additional details of various embodiments of the present invention will be described below with reference to the figures.

As will be described below, the embodiments described herein can be used, for example, to provide for configuration of a new installation of an application. In other implementations, embodiments can be used to configure an already installed (i.e., configured, working, in use) executable application. For example, a customer may want to start using a new feature or module of the executable application, or a related application in a suite of applications, etc. In such cases, they can use an implementation of the configuration tool described herein to configure that new part.

FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk®, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g. 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java™ servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle, Microsoft, Sybase™, IBM™ and the like, which can process requests from database clients running on a user computer 105, 110.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
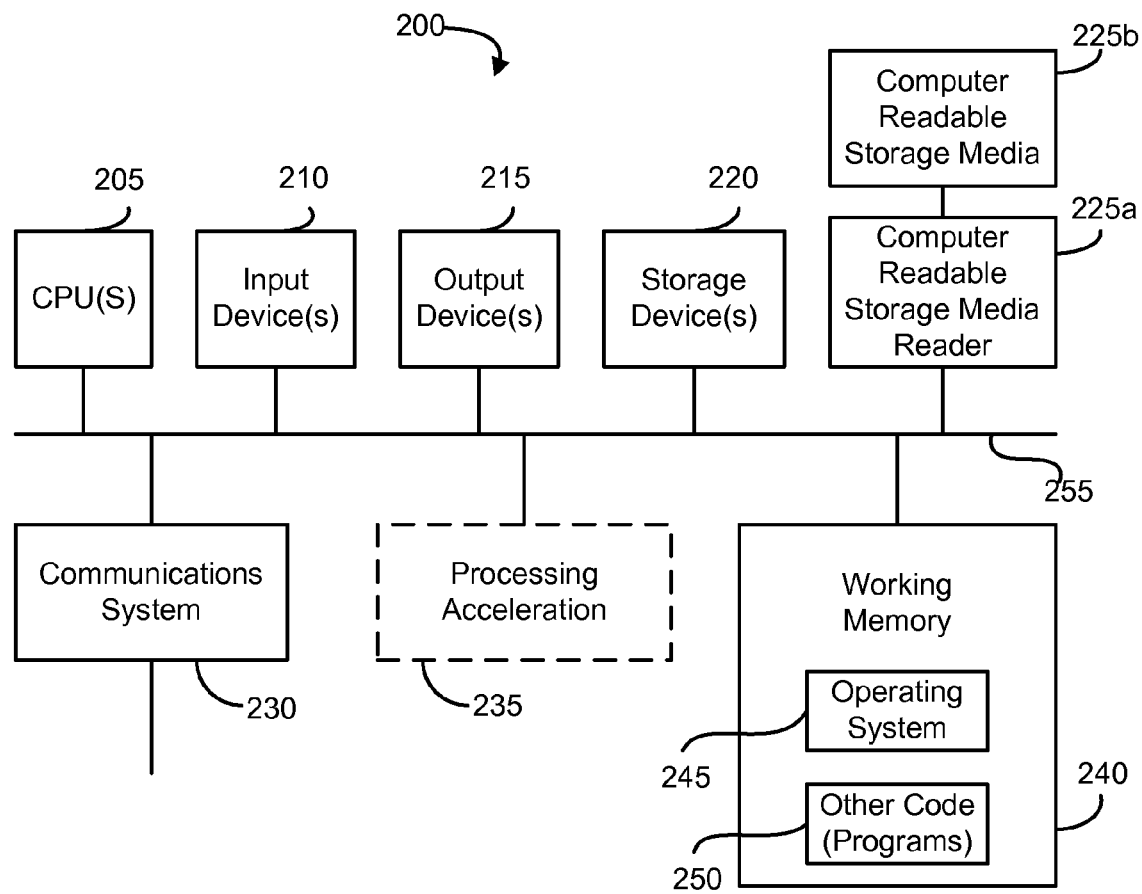
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing the methods and systems described herein.

Figure 3:
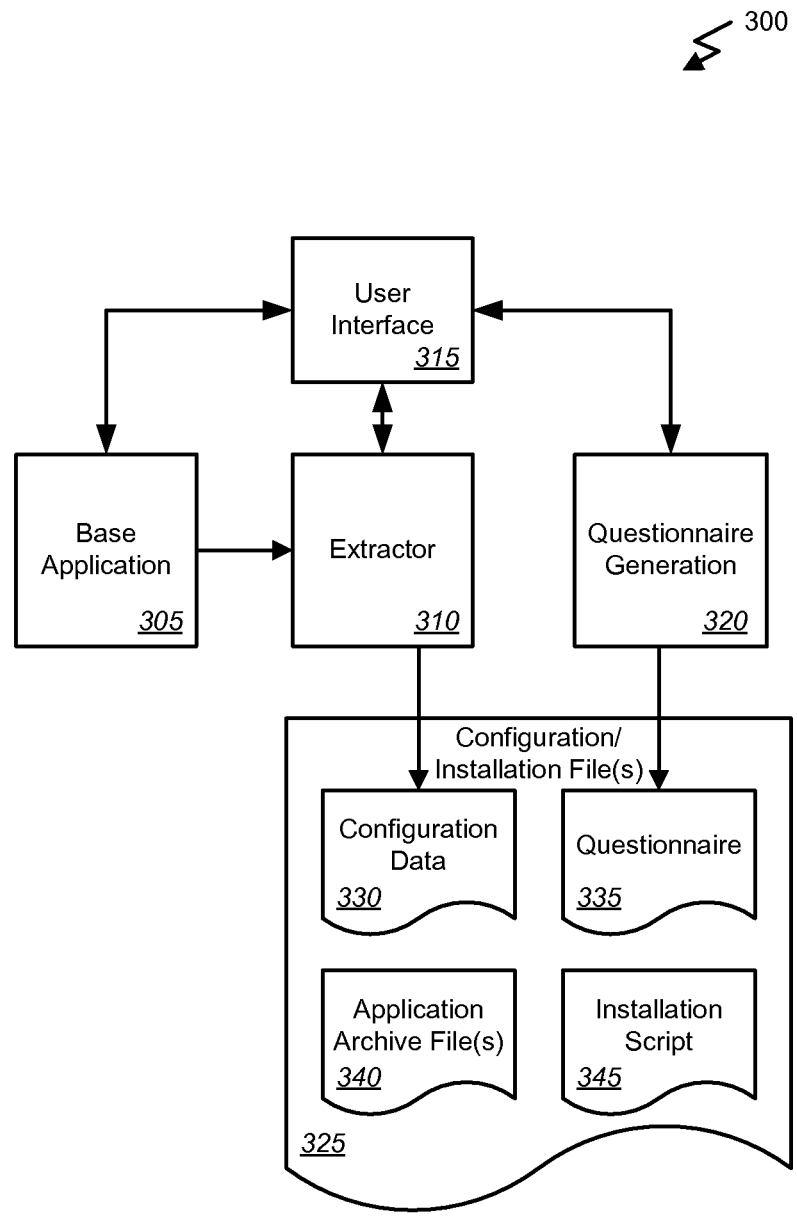
FIG. 3 is a block diagram illustrating functional components of a system for generating and delivering configuration information for an application according to one embodiment of the present invention.

FIG. 3 is a block diagram illustrating functional components of a system for generating and delivering configuration information for an application according to one embodiment of the present invention. This system 300 represents one possible example of a system that can be employed by a software vendor, service provider, or other party to provide configuration information for an application. As noted above, the embodiments described herein can be used, for example, to provide for configuration of a new installation of an application. In other implementations, embodiments can be used to configure an already installed (i.e., configured, working, in use) executable application. For example, a customer may want to start using a new feature or module of the executable application, or a related application in a suite of applications, etc. In such cases, they can use an implementation of the configuration tool described herein to configure that new part. As will be seen, other implementations are possible and not all of the elements illustrated here are required in other implementations.

In this example, the system includes a base version of the application 305, a user interface 315, an extractor 310, and questionnaire generation module 320. The base version of the application 305 can comprise, for example, a version of the application 305 that has been pre-configured for a particular user, group of users, market, region, industry, etc. Generally speaking, the system 300 can be adapted to save a set of configuration information 330 related to the application. For example, the base version of the application 305 can be configured and the set of configuration information 330 can be extracted from the base version of the application 305 by the extraction module 310. According to one embodiment, the extraction module can be implemented according to the methods and systems described in U.S. patent application Ser. No. 11/380,254 filed Apr. 26, 2006 and entitled "Tool for Automated Extraction and Loading of Configuration Settings" the entire disclosure of which is incorporated herein by reference for all purposes. Alternatively or additionally, configuration information 330 for the application can be set and saved in other ways. For example, configuration information 330 can be entered manually via the user interface 315, copied from a set of other, preset data (not shown here), via some combination of these methods or in another manner.

The questionnaire generation module 320 can be adapted to generate and save a questionnaire 335 related to the configuration of the application. That is, via the questionnaire generation module 320 a set of one or more questions related to configuration of the application can be defined and saved in a questionnaire 335. In some cases, the questions may relate to some or all of the configuration information 330 extracted and/or saved. That is, at least one of the set of one or more questions of the questionnaire 335 can relate to at least a subset of the set of configuration information 330. In other cases, the questions of the questionnaire 325 can be related or directed to configuration settings of the application other than those extracted and/or saved. Additional details of exemplary contents of the questionnaire 335 will be described below with reference to FIG. 4.

Generally speaking, defining the set of one or more questions of the questionnaire 320 can comprise identifying the one or more questions and defining the questions, for example according to a predetermined data model. That is, there can be a data model associated with the questions that allows the 'answers' to be both pre-seeded and saved when they are manipulated by the user. Identifying and defining the questions can be performed by the questionnaire generation module 320 based on direction or input from the user via the user interface 315. That is, a user can enter a question, identify configurations settings of the application and/or saved configuration information 330 to which the question relates and, as will be seen, instructions for loading or updating the configuration settings of an installed executable version of the application based on answers to those questions. The exact format of the user interface 315 can vary based on the exact implementation of the system 300 without departing from the scope of the present invention.

It should be noted that, the set of extracted and/or saved configuration information 330 can comprise configuration information for a plurality of different configurations of the application. In such a case, the set of questions stored in the questionnaire 335 can comprise one or more questions directed to selecting one of the plurality of different configurations of the application. The set of questions can also comprise at least one subset of questions related to the selected configuration. That is, the base application 305 (if any) can comprise multiple versions or configurations. From or based on these configurations, multiple sets of configuration data 330 can be extracted and/or saved. Multiple sets of questions corresponding to or supplementing these multiple sets of configuration information can also be defined and saved in the questionnaire 335. One or more of the questions can also be defined for selecting between these multiple configurations. As will be seen, based on an answer to such configuration selection question(s), the corresponding set of configuration information and questions can be used to update or configure an installed executable version of the application. Additional details of an exemplary process for generating and delivering configuration information for an application will be described below with reference to FIG. 6.

The set of configuration information 330 and the questionnaire 335 can be delivered for use in configuring an installation of the application. That is, the software vendor, service provider, or other party providing configuration information for the application can save the configuration information 330 and questionnaire 335 as part of one or more configuration or installation files 325 that can be distributed to a user or client system. An executable version of the application on the client or other system can be configured based on the set of configuration information and answers to the set of one or more questions. Details of an exemplary system for configuring an executable version of an application based on the pre-set configuration information 330 can the questionnaire 335 will be described below with reference to FIG. 5. Additional details of an exemplary method for configuring an executable version of an application based on the pre-set configuration information 330 can the questionnaire 335 will be described below with reference to FIG. 7.

The configuration information 330 and questionnaire 335 can be provided as part of or saved in the set of one or more configuration or installation files 325. In cases where the configuration information 330 and questionnaire 335 are provided as part of distribution of the application itself, the configuration or installation files 325 can also include one or more application archive files 340 and/or an installation script 345 for installing the application from the application archive files 340. However, it should be noted that embodiments of the present invention are not limited to use in situations where an application is being distributed along with the configuration information. That is, it is not required that the configuration information 330 and questionnaire 335 be generated or distributed with application archive files 340 or installation script 345. Rather, configuration information 330 and questionnaires 335 can be generated and distributed separate from or independent of the rest of a software package. For example, configuration information 330 and questionnaires 335 can be generated and distributed as part of an update to previously installed applications. In another example, configuration information 330 and questionnaires 335 can be generated prior to installation of the application, such as during a sales or consulting meeting, and later used upon installation or after installation of the application to configure the application based on the information obtained during the meeting. Other implementations are also contemplated and considered to be within the scope of the present invention.

Figure 4:
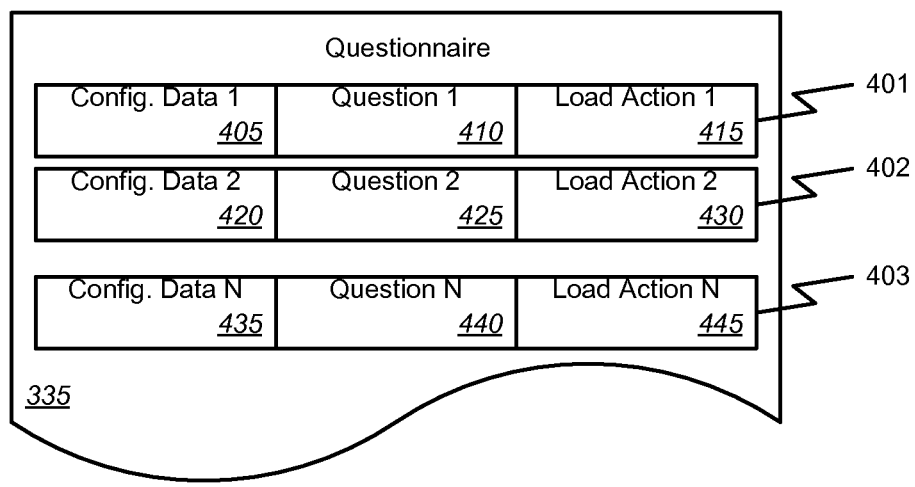
FIG. 4 is a block diagram illustrating details of an configuration schedule file according to one embodiment of the present invention.

FIG. 4 is a block diagram illustrating details of an configuration schedule file according to one embodiment of the present invention. It should be noted that the questionnaire 335 illustrated here is offered by way of example only and is not intended to limit the scope of the present invention. Rather, the contents of the questionnaire 335 can vary between implementations. The questionnaire 335 can comprise a file in a standard language such as eXtensible Markup Language (XML). However, other standard and non-standard languages and formats are contemplated and also considered to be within the scope of the present invention.

In this example, the questionnaire 335 can contain a number of entries 401, 402, and 403 or records. Each entry can include a question 410, 425, and 440. The questions 410, 425, and 440 can be expressed, for example, as text to be displayed or presented to the user during an installation or configuration process. Each entry 401, 402, and 403 can also include a load action or instruction 415, 430, and 445 associated with the question 410, 425, and 440 and/or the answer thereto. The load action 415, 430, and 445 can define one or more configuration settings of the application to set or update based on the answer to each question. For example, the load action can comprise an Application Program Interface (API) call to the application program for setting the one or more configuration settings.

The entries 401, 402, and 403 of the questionnaire 335 may also include an indication of configuration data 405, 420, and 435 associated with one or more of the questions 410, 425, and 440. The indication of configuration data 405, 420, and 435 can comprise a pointer, hyperlink, or other direction to configuration information or settings associated with the question or may contain the data itself. In the case where the configuration data 405, 420, and 435 includes the data itself, the questionnaire 335 and configuration data 330 described above can comprise the same file rather than separate files as illustrated in FIG. 3. The indication of the configuration data 405, 420, and 435 can be used, for example, to provide a default or suggested setting when presenting the question 410, 425, or 440, with which it is associated which can then be accepted or modified by the user. It should be noted that in other implementations a question may have no configuration data associated with it, and may still have a load action. For example, the load action may take text input from the user and use it to configure the executable version of the application.

Figure 5:
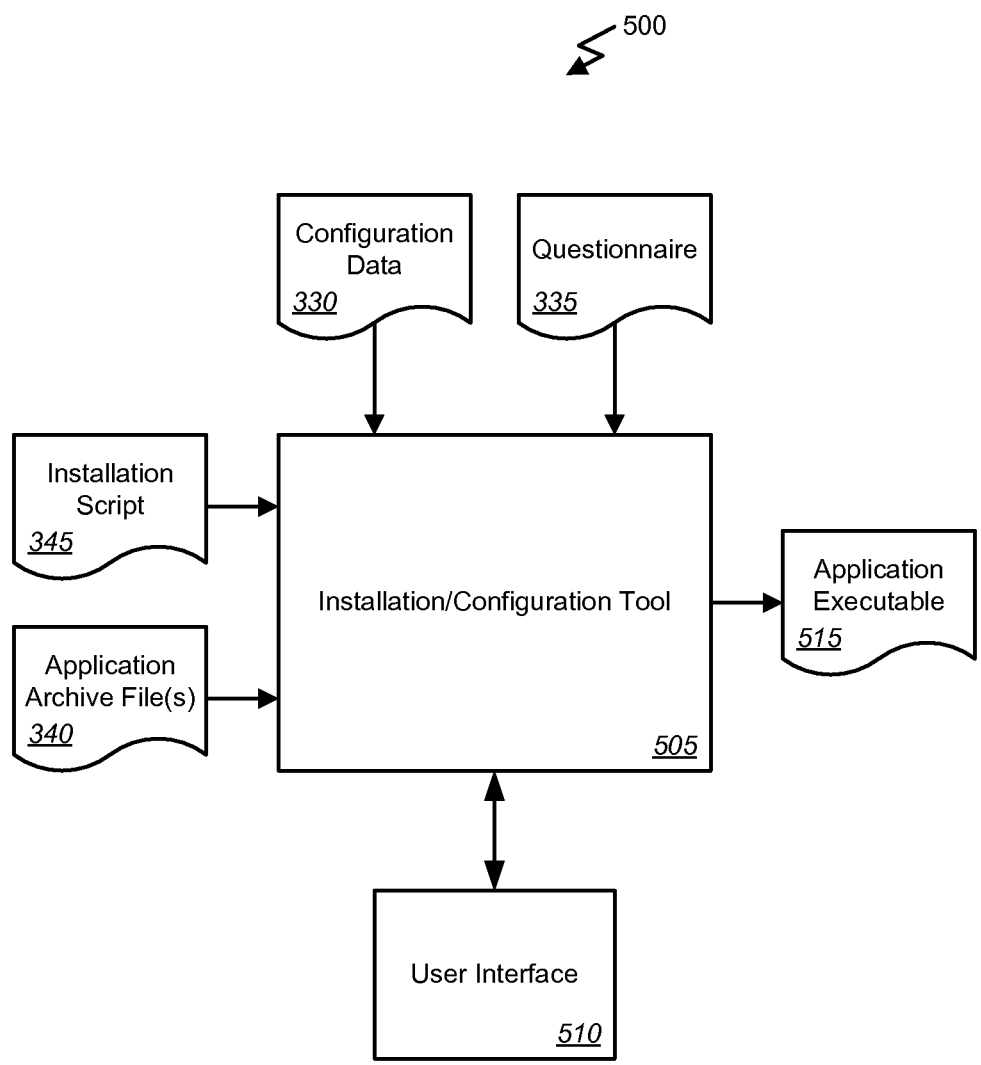
FIG. 5 is a block diagram illustrating functional components of a system for configuring an application according to one embodiment of the present invention.

FIG. 5 is a block diagram illustrating functional components of a system for configuring an application according to one embodiment of the present invention. This system 500 represents one possible example of a system that can be employed as a client or user system upon which an executable version of the application will reside and/or be executed. As will be seen, other implementations are possible and not all of the elements illustrated here are required in other implementations.

In this example, the system includes an installation and/or configuration tool 505. According to one embodiment, the installation and/or configuration tool 505 can be adapted to install an executable version of the application 515, for example, from an application archive file 340 and possibly based on an installation script 345, both of which can be provided by a software vendor or other party as described above. Additionally or alternatively, the installation and/or configuration tool 505 can be adapted to load a set of pre-configuration information 330 provided by the software vendor or other party as configuration settings for an executable version of the application 515. Loading a set of pre-configuration information 330 as configuration settings for an executable version of the application 515 can be performed, for example, according to the methods and systems described in the application entitled "Tool for Automated Extraction and Loading of Configuration Settings" referenced above.

The installation and/or configuration tool 505 can also be adapted to present the set of one or more questions from the questionnaire 335. For example, the installation and/or configuration tool 505 can display or otherwise present the questions in text and/or graphical form and receive answers to the questions via user interface 510. The installation and/or configuration tool 505 can then update the configuration settings for the executable version of the application 515 based on the answers to the set of one or more questions of the questionnaire 335.

Figure 6:
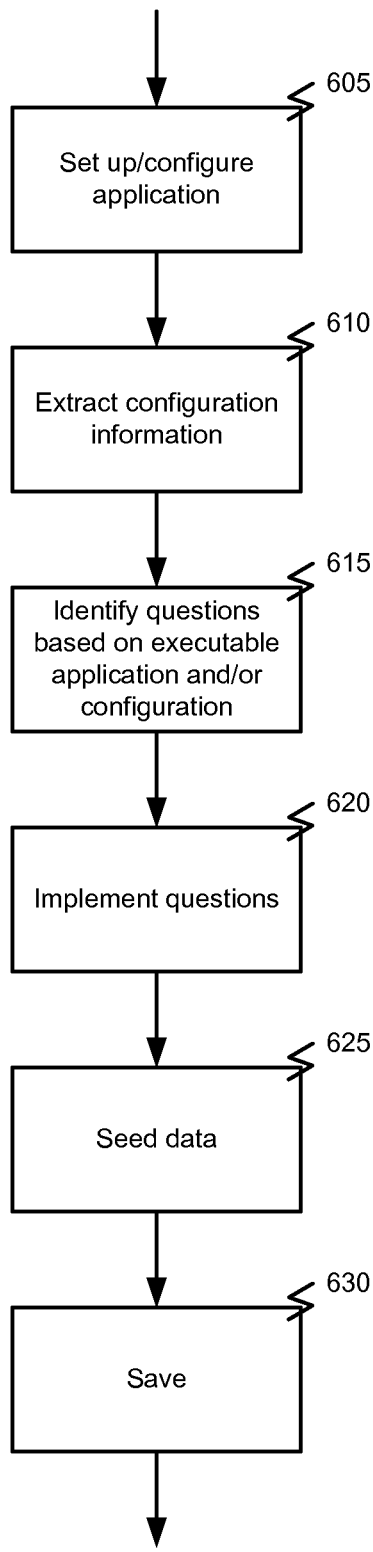
FIG. 6 is a flowchart illustrating a process for generating and delivering configuration information for an application according to one embodiment of the present invention.

FIG. 6 is a flowchart illustrating a process for generating and delivering configuration information for an application according to one embodiment of the present invention. More specifically, this example illustrates a process as may be implemented by a system such as described above with reference to FIG. 3 to generate a questionnaire or other set of seeded data for distribution to one or more users or other parties for use in configuring an executable version of an application. In the example of FIG. 6, the process begins with setting up or configuring 605 a base version of the application. A set of configuration information can be extracted 610 from the base version of the application as described above. Also as noted above, rather that configuring 605 the base version and extracting 610 the configuration information, the base set of configuration information can be set or defined in other ways. For example, the information may be manually set, copied from another set of information, or set in other ways.

As noted above, a set of one or more questions related to configuration of the application can be defined and saved. In some cases, at least one of the set of one or more questions related to configuration of the application can relate to at least a subset of the set of configuration information. Defining the set of one or more questions can comprise identifying 615 the one or more questions for example, based on the configuration and/or the application. The one or more questions can then be implemented 620. Implementing 620 the one or more questions can comprise defining a load action associated with an answer to each question, the load action defining one or more configuration settings of the application to set based on the answer to each question. For example, the load action can comprise an Application Program Interface (API) call to the application program for setting the one or more configuration settings.

A set of data defining the one or more questions can be seeded 625. That is, a questionnaire such as described above with reference to FIG. 4 can be created. As noted above, the questionnaire or other set of data can include one or more questions associated with or identifying configuration data to which the question relates and one or more API calls or other instructions for updating that configuration data based on answer(s) to the question. The set of one or more questions, i.e., the seeded set of data, can then be saved 630. The set of configuration information and the set of one or more questions, i.e., the seeded set of data, can be delivered for use in configuring an installation of the application as described below with reference to FIG. 7.

Figure 7:
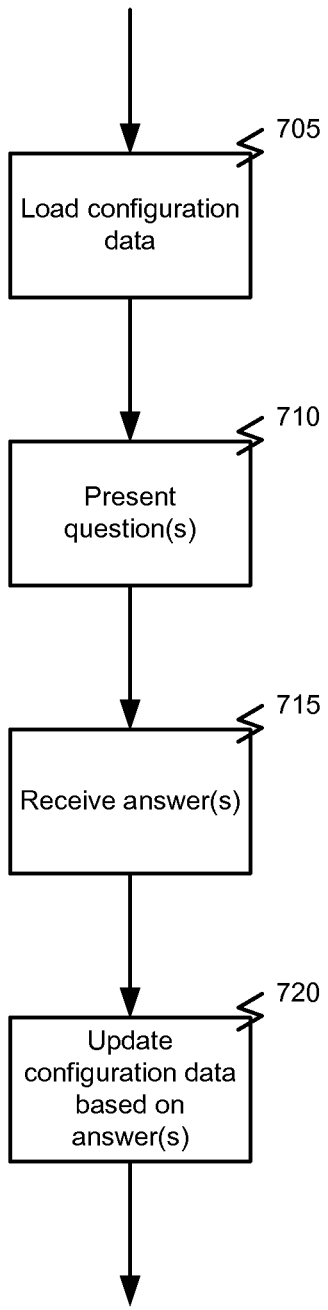
FIG. 7 is a flowchart illustrating a process for configuring an application according to one embodiment of the present invention.

FIG. 7 is a flowchart illustrating a process for configuring an application according to one embodiment of the present invention. More specifically, this example illustrates a process as may be implemented by a system such as described above with reference to FIG. 5 to configure an executable version of an application either during installation or upon request. In this example, the process begins with loading 705 a set of pre-configuration information as configuration settings for an executable version of the application. A set of one or more questions related to configuration of the application can be read and presented 710. Answers to the one or more questions can be received 715. The configuration settings for the executable version of the application can be updated 720 based on the answers to the set of one or more questions.

As noted above, at least one of the set of one or more questions related to the configuration of the application can relate to at least a subset of the pre-configuration information. In other cases, the questions may not relate to the pre-configuration information but may rather relate to other configuration settings of the executable version of the application. In some cases, the set of configuration information can comprise configuration information for a plurality of different configurations of the application. In such cases, the set of questions can comprise at least one question directed to selecting one of the plurality of different configurations of the application. One of different configurations of the application can be selected based on an answer to the at least one question directed to selecting one of the plurality of different configurations. Furthermore, in such cases, the set of questions can comprise at least one subset of questions related to the selected configuration. Presenting the set of one or more questions related to configuration of the application can then comprise presenting the subset of questions related to the selected configuration. That is, the process illustrated by FIG. 7 may in fact be an iterative process in which the user, by answering one question, identifies a subset of configuration information and/or questions which triggers another set of questions in a continuing dialog.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for delivering configuration information for an application, the method comprising:
    saving by a software provider computer system a set of configuration information related to the application in a set of installation files, the set of installation files including the set of configuration information, a set of application archive files, and one or more installation scripts;
    defining by the software provider computer system a questionnaire file, the questionnaire file comprising a set of one or more records, each record comprising a question related to configuration of the application, an identifier of configuration information associated with the question of the record, and a definition of a load action to update the configuration information associated with the question of the record based on an answer to the question of the record;
    saving by the software provider computer system the set of one or more questions in the set of installation files; and
    delivering by the software provider computer system the set of set of installation files to a user computer system for use in configuring an installation of the application.

2. The method of claim 1, wherein at least one of the set of one or more questions related to configuration of the application relates to at least a subset of the set of configuration information.

3. The method of claim 1, further comprising, prior to saving the set of configuration information related to the application:
    configuring by the software provider computer system a base version of the application; and
    extracting by the software provider computer system the set of configuration information from the base version of the application.

4. The method of claim 1, wherein defining the set of one or more questions comprises:
    identifying the one or more questions;
    implementing the one or more questions; and
    seeding a set of data defining suggested the answers to the one or more questions.

5. The method of claim 4, wherein implementing the one or more questions comprises defining a load action associated with an answer to each question, the load action defining one or more configuration settings of the application to set based on the answer to each question.

6. The method of claim 5, wherein the load action comprises an Application Program Interface (API) call to the application program for setting the one or more configuration settings.

7. The method of claim 4, wherein saving the set of one or more questions comprises saving the seeded set of data.

8. The method of claim 1, wherein the set of configuration information comprises configuration information for a plurality of different configurations of the application.

9. The method of claim 8, wherein the set of questions comprises at least one question directed to selecting one of the plurality of different configurations of the application.

10. The method of claim 9, wherein the set of questions comprises at least one subset of questions related to the selected configuration.

11. The method of claim 1, further comprising configuring by the user computer system an executable version of the application based on the set of configuration information and answers to the set of one or more questions.

12. The method of claim 11, wherein configuring the executable version of the application based one the set of configuration information and answers to the set of one or more questions comprises:
    loading the configuration information as configuration settings for the executable version of the application;
    presenting the set of one or more questions;
    receiving the answers to the one or more questions; and
    updating the configuration settings for the executable version of the application based on the answers to the set of one or more questions.

13. The method of claim 1, wherein the identifier of the configuration information associated with the question for at least one record of the questionnaire also includes default data for the answer to the question for the at least one record.

14. The method of claim 1, wherein the identifier of the configuration information associated with the question for at least one record of the questionnaire comprises a hyperlink or pointer to the configuration information.

15. The method of claim 1, wherein the definition of the load action to update the configuration information based on the answer to the question for at least one of the records of the questionnaire comprise an Application Program Interface (API) call to the application.

16. A system comprising:
    a processor; and
    a memory communicatively coupled with and readable by the processor, the memory having stored therein a set of instructions which, when executed by the processor, cause the processor to save a set of configuration information related to an application in a set of installation files, the set of installation files including the set of configuration information, a set of application archive files, and one or more installation scripts, define a questionnaire file, the questionnaire file comprising a set of one or more records, each record comprising a question related to configuration of the application, an identifier of configuration information associated with the question of the record, and a definition of a load action to update the configuration information associated with the question of the record based on an answer to the question of the record, save the set of one or more questions in the set of installation files, and deliver the set of installation files to a user computer system for use in configuring an installation of the application.

17. The system of claim 16, wherein at least one of the set of one or more questions related to configuration of the application relates to at least a subset of the set of configuration information.

18. The system of claim 16, wherein the instructions further cause the processor to, prior to saving the set of configuration information related to the application, configure a base version of the application and extract the set of configuration information from the base version of the application.

19. The system of claim 16, wherein defining the set of one or more questions comprises:
   identifying the one or more questions;
   implementing the one or more questions; and
   seeding a set of data defining the one or more questions.

20. The system of claim 19, wherein implementing the one or more questions comprises defining a load action associated with an answer to each question, the load action defining one or more configuration settings of the application to set based on the answer to each question.

21. The system of claim 20, wherein the load action comprises an Application Program Interface (API) call to the application program for setting the one or more configuration settings.

22. The system of claim 19, wherein saving the set of one or more questions comprises saving the seeded set of data.

23. The system of claim 16, wherein the set of configuration information comprises configuration information for a plurality of different configurations of the application.

24. The system of claim 23, wherein the set of questions comprises at least one question directed to selecting one of the plurality of different configurations of the application.

25. The system of claim 24, wherein the set of questions comprises at least one subset of questions related to the selected configuration.

\* \* \* \* \*

UNITED STATES PATENT AND TRADEMARK OFFICE
CERTIFICATE OF CORRECTION

PATENT NO. : 8,464,244 B2  
APPLICATION NO. : 11/970833  
DATED : June 11, 2013  
INVENTOR(S) : Stern et al.

Page 1 of 1

It is certified that error appears in the above-identified patent and that said Letters Patent is hereby corrected as shown below:

On Title page 2, column 1, under Other Publications, line 1, delete "IIi.9," and insert -- 11i.9, --, therefor.

In the Specification:

Column 6, line 67, delete "may can" and insert -- can --, therefor.

In the Claims:

Column 13, line 62, in Claim 1, after "set of" delete "set of".

Column 14, line 40, in Claim 12, delete "one" and insert -- on --, therefor.

Signed and Sealed this
Eighth Day of October, 2013

Teresa Stanek Rea
*Deputy Director of the United States Patent and Trademark Office*